United States Patent [19]
Bergamini

[11] Patent Number: 5,927,321
[45] Date of Patent: Jul. 27, 1999

[54] SYSTEM FOR MEASURING AND CONTROLLING GAS MASS FLOW

[75] Inventor: Lorenzo Bergamini, Bari, Italy

[73] Assignee: Nuovo Pignone, S.p.A., Florence, Italy

[21] Appl. No.: 08/738,774

[22] Filed: Oct. 29, 1996

[30] Foreign Application Priority Data

Oct. 30, 1995 [IT] Italy ................................. MI95A2233

[51] Int. Cl.⁶ ....................................................... G05D 7/06
[52] U.S. Cl. .................................. 137/487.5; 137/118.04; 137/486; 137/468; 73/1.16; 73/861.354
[58] Field of Search ................................ 137/110, 487.5, 137/486, 118.04, 468; 73/861.354, 1.16

[56] References Cited

U.S. PATENT DOCUMENTS

| | | | |
|---|---|---|---|
| 4,149,254 | 4/1979 | Molusis . | |
| 4,406,161 | 9/1983 | Locke . | |
| 4,823,613 | 4/1989 | Cage . | |
| 5,044,208 | 9/1991 | Corown | 73/861.354 |
| 5,072,416 | 12/1991 | Francisco | 73/1.16 |
| 5,080,131 | 1/1992 | Ono | 137/487.5 |
| 5,190,068 | 3/1993 | Philbin | 137/487.5 |
| 5,392,656 | 2/1995 | Lew | 73/861.354 |
| 5,458,005 | 10/1995 | Perelshteyn | 73/861.354 |
| 5,488,969 | 2/1996 | King | 137/487.5 |
| 5,537,914 | 7/1996 | Gibney . | |
| 5,586,574 | 12/1996 | Smith | 137/487.5 |

FOREIGN PATENT DOCUMENTS

4339197A1  11/1994  Germany .

*Primary Examiner*—Denise L. Ferensic
*Assistant Examiner*—Ramyar Farid

[57] ABSTRACT

A system for measuring and controlling the mass flow of a gas of variable characteristics within a pipe by a metering valve, wherein a Coriolis mass flow meter mounted in the pipe is connected to the valve processor unit to calculate a correction factor for the flow rate calculated by the valve and represented by the ratio of the values originating from the Coriolis meter to those originating from the valve, this factor being updated periodically when the operating conditions do not introduce an error into the Coriolis meter. A multi-valve system for different flow rates is also described comprising a single Coriolis meter.

4 Claims, 2 Drawing Sheets

SYSTEM FOR MEASURING AND CONTROLLING GAS MASS FLOW

BACKGROUND OF THE INVENTION

This invention relates to a system which although dispensing with the use of a costly and bulky gas chromatograph enables precise and reliable measurement and control of a gas mass flow to be achieved with a metering valve, even when the gas characteristics vary. Controlling a gas mass flow when the process requires a large ratio between maximum and minimum flows, with large variability in the pressure drop across the control valve, presents considerable difficulties, especially for fast control dynamics. Mass flow meters based on the Coriolis effect can achieve the required accuracy, reliability and measurement range, but typically provide insufficient measurement dynamics for those applications involving dynamically variable operating conditions. Another solution is achieved by using metering valves which potentially have all the necessary characteristics but require physical data regarding the gas, which have to be inevitably provided by an in-line gas chromatograph, if the gas composition varies. Said gas chromatograph introduces a considerable cost factor into the system, requires a supplementary gas feed giving rise to constructional complications and, in view of its structure, reduces the reliability and availability of the system.

SUMMARY OF THE INVENTION

An object of the present invention is to be able to measure and control a gas mass flow of variable physical characteristics using a metering valve, for example such as that described in another patent application of the present Applicant, without the need for an in-line gas-chromatograph.

This is achieved in that the influence of the physical characteristics of the controlled gas on the mass flow is reduced, with reference to the use of metering valves, to a single correction parameter for the calculated flow rate of the metering valve, said parameter being easily obtained from the value measured by a Coriolis meter, which in this manner replaces the costly gas chromatograph.

Again, the influence of said correction parameter on overall accuracy must be such as to enable it to be updated periodically and non-dynamically, in practice in accordance with the facilities and limits of a normal Coriolis meter, so that fast dynamics measurement and control are delegated to the metering valve or to several valves of the same type connected in parallel and controlling different fractions of the total flow.

A further object of the present invention is to overcome, by virtue of the intrinsic redundancy of a system formed from several metering valves in parallel and a Coriolis meter, the effect of the loss of one or more items of information from the sensors used by the metering valves.

The control and measurement system of the present invention is therefore based on the use of metering valves provided with their own processor unit which makes them able to measure mass flow with the ability to handle the control dynamics associated with a Coriolis mass flow meter which provides mass flow data with a response time slower than that required by the process.

Said flow control and measurement system according to the invention is able to determine a correction factor for the flow rate calculated from the metering valve by comparing this with the flow rate originating from the Coriolis meter under nearly stationary operating conditions. In practice the system provides for the valve (or several valves in parallel) to control and measure the flow rate using previously determined data concerning the gas physical characteristics, these data being corrected and updated each time the process dynamics enable the Coriolis meter to provide a valid value. Said correction factor is structured such that the metering accuracy is not degraded, by updating this parameter only when the conditions are nearly stationary.

Hence, the system for measuring and controlling the mass flow of a gas of variable characteristics within a pipe, comprising at least one metering valve mounted in said pipe and of which the actuator is controlled by a corresponding processor unit on the basis of values, provided by said metering valve, representing gas pressure upstream and downstream of the valve and possibly gas temperature, on the basis of a value representing the required mass flow, and on the basis of the gas characteristics, is characterised according to the present invention in that said gas characteristics are provided to said processor unit by a Coriolis meter positioned in said pipe at that point upstream or downstream of the valve at which pressure variations are least, in the form of a single correction factor for the flow rate calculated by said valve, and represented by the ratio of the measurements originating from the Coriolis meter to those originating from the group of metering valves, this factor being updated periodically when the operating conditions are nearly stationary.

Again, as said flow correction factor is mainly a function of the physical properties of the gas and hence does not depend substantially on valve metering errors, it is now possible to use several metering valves connected in parallel and in series with a single Coriolis meter, to control different partial flow fractions of a single entry flow.

More specifically, a plurality of metering valves are connected in parallel along branches from the main pipe and in series with a single Coriolis meter, the processor units for said valves being connected to a central processor unit connected to said Coriolis meter to provide the individual valves with the correction factor for the partial mass flows relative to said valves.

BRIEF DESCRIPTION OF THE DRAWINGS

The invention is further clarified hereinafter with reference to the accompanying drawings which illustrate preferred embodiments thereof given by way of non-limiting example in that technical and constructional modifications can be made thereto without leaving the scope of the present invention.

On said drawings.

DETAILED DESCRIPTION

Figure 1:
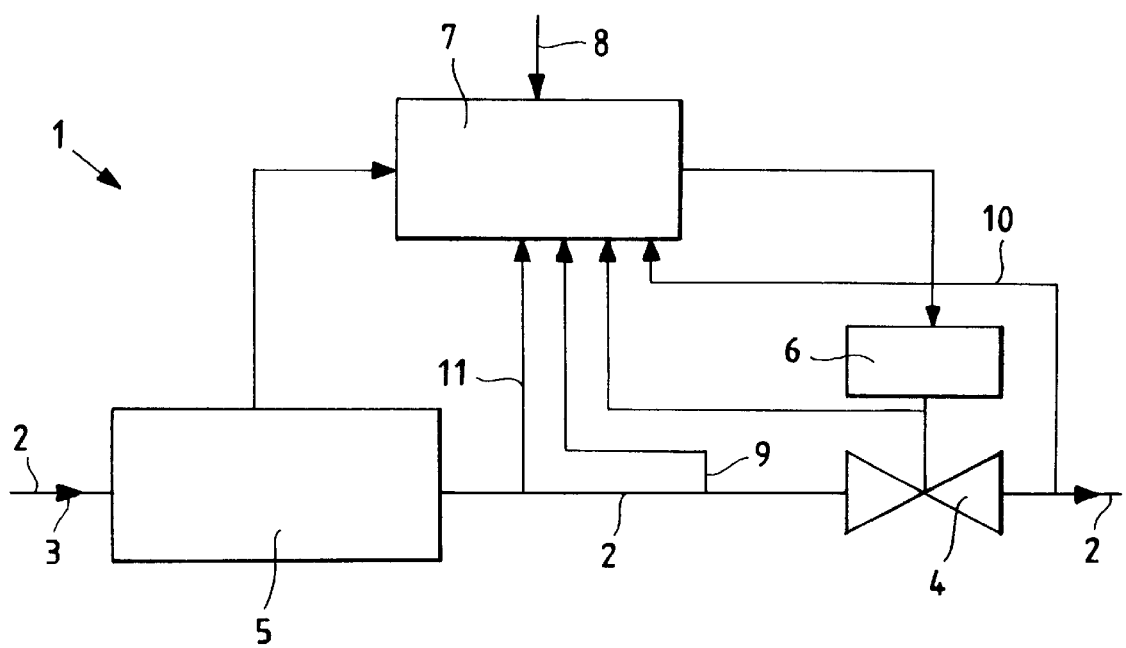
FIG. 1 is a schematic block diagram of the system for measuring and controlling gas mass flow according to the invention.

In FIG. 1, the reference numeral 1 indicates the system of the invention, consisting of a pipe 2 within which the gas flows in the direction of the arrow 3 and in which the metering valve 4 and a Coriolis meter 5 are mounted respectively.

The actuator 6 of the valve 4 is controlled by the processor unit 7 to which the required mass flow value 8, the pressure 9 upstream and the pressure 10 downstream of the valve and possibly the gas temperature 11 are fed. The processor unit 7 is also connected to said Coriolis meter 5. The Coriolis meter 5 is positioned upstream of the metering valve 4 if the pressure downstream of the valve 4 undergoes greater variation than that upstream, and is positioned downstream when the opposite situation occurs.

Various formulas are possible for calculating the mass flow from the measurements made by a metering valve 4.

The flow correction factor, calculated by the processor unit 7, can take various forms according to the formula used by the metering valve 4. In all cases the flow through a restriction is inversely proportional to the square root of the gas elastic constant, and the correction factor obtained as the ratio of measurements originating from the Coriolis meter 5 to measurements originating from the metering valve 4 can be put equal to the square root of the ratio of the nominal elastic constant to the effective elastic constant of the gas. More generally, it can be stated that this correction factor is a function of the product:

$$zR\eta$$

where: z is the gas compressibility coefficient

R is the gas elastic constant $\eta$ is the correction factor which takes account of the effect on the flow of variations in the isentropic exponent from the nominal value, of errors in determining the discharge coefficient and of errors introduced by the measurements made by the pressure and temperature sensors.

This calculation is made periodically only at those time intervals in which the control signal and the measured quantity are nearly stationary, or when the flow rate measured by a conventional Coriolis meter presents its minimum non-nearly stationary error. The metering valve uses the last valid value of the product $zR\eta$ to effect flow control when the nearly stationary condition does not apply.

The condition of near being nearly stationary, which enables the information originating from the Coriolis meter to be used, can be determined using the control signal received from the metering valve 4. A first criterion uses the first derivative of said signal; if this derivative remains less than a threshold value for a certain time period exceeding the time constant of the meter, the condition of near stationariness is verified and the factor $zR\eta$ can be calculated, or when the mean square deviation applied to samples of said control signal over a time interval is less than a predetermined threshold value.

In certain situations the dynamic error can be removed from the measurement originating from the Coriolis meter 5, so increasing the facility for measuring the factor $zR\eta$.

Figure 2:
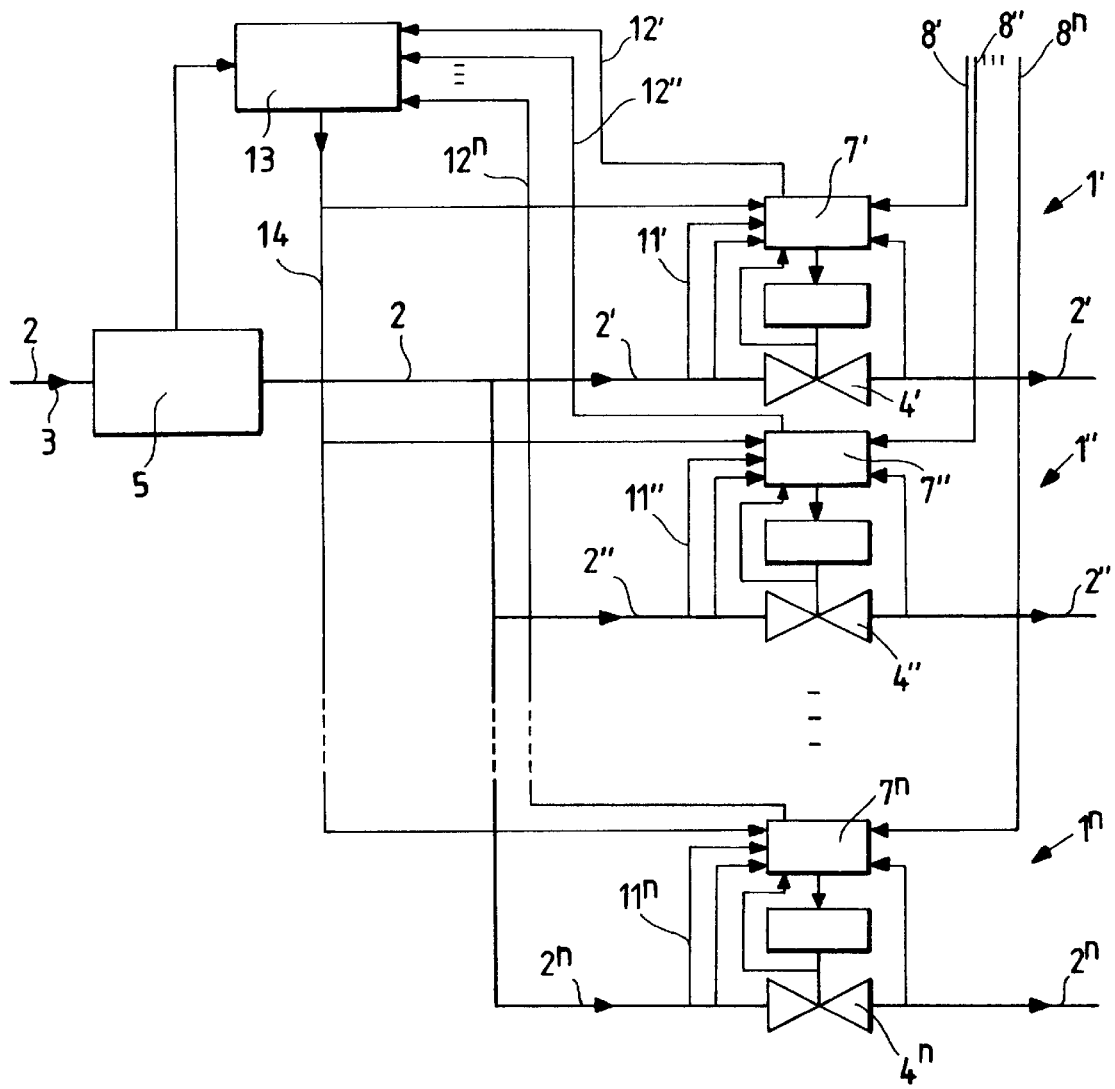
FIG. 2 is a schematic block diagram showing the use of several metering valves for controlling several partial flow fractions of a total flow, also according to the invention.

As can be seen from FIG. 2, the principle can be applied to a control system consisting of several valves 4', 4", ... 4$^n$ in parallel with each other and in series with a single Coriolis meter 5 positioned in the main pipe 2. Said valves 4', 4", ... 4$^n$ are positioned in branches 2', 2", ... 2$^n$ respectively, from the pipe 2. As already stated, because the flow correction factor (for example the product $zR\eta$) is mainly a function of the physical properties of the gas and only to a secondary extent of the errors deriving from measurements made in individual branches, it can be used by all the parallel metering valves. In particular, the product $zR\eta$ can be obtained, in this case, from the following formula:

$$zR\eta = \left[ (1/G_{Coriolis}) \cdot \sum_{i=1}^{n} \left( G_i \sqrt{(zR\eta)_{preceding}} \right) \right]^2$$

where Gi indicates the generic mass flow measured (or required) in one of the parallel branches, Gcoriolis indicates the total mass flow originating from the Coriolis meter and n is the number of branches used.

The outputs 12', 12", ... 12$^n$ of the processor units 7', 7", ... 7$^n$ of said metering valves 4', 4", ... 4$^n$, which provide the partial mass flow values of said valves, are fed to said single processor unit 13 which, connected to said single Coriolis meter 5, provides as its output 14 a mass flow correction factor used by said processor units 7', 7", ... 7$^n$ to control the partial mass flows. If the metering valve 4 does not provide for gas absolute temperature measurement, given by 11, it is possible to include this quantity in the correction factor (becoming, for example, $zR\eta T$). In this respect, in all its calculation expressions the flow rate is inversely proportional to the square root of this temperature. In this case the metering accuracy would be equal to that obtainable by the system including temperature measurement only under stationary conditions, whereas under dynamic conditions it would worsen because the influence of the correction factor on the result is greater.

I claim:

1. A system for measuring and controlling a mass flow rate of a gas within a pipe, the gas having variable physical characteristics, the system comprising:

a metering valve for controlling the mass flow of the gas by altering a size of a valve opening in said metering valve;

a valve actuator coupled to said metering valve for controlling said metering valve to alter the size of the valve opening;

a processor unit electrically coupled to said metering valve and said valve actuator, said processor unit determining a mass flow rate of the gas passing through said metering valve based on the size of the valve opening in said metering valve, said processor unit receiving a desired mass flow rate of the gas as an input signal; and a Coriolis mass flow meter fluidly coupled to said metering valve, said Coriolis mass flow meter measuring the mass flow rate of the gas passing therethrough, said Coriolis mass flow meter providing the measured mass flow rate of the gas to the processor unit;

wherein the processor unit calculates a correction factor corresponding to a ratio of the measured mass flow rate of the gas, measured by said Coriolis mass flow meter, and the mass flow rate determined by the processor unit, and controls said valve actuator in accordance with the correction factor to cause the valve actuator to alter the size of the valve opening so as to realize the desired mass flow rate of the gas through said metering valve.

2. The system for measuring and controlling a mass flow rate of a gas within a pipe according to claim 1 further comprising:

a pressure sensor for obtaining pressure readings upstream and downstream of said metering valve for use in determining a position of the Coriolis mass flow meter in relation to said metering valve.

3. The system for measuring and controlling a mass flow rate of a gas within a pipe according to claim 2, wherein the Coriolis meter is positioned at one of an upstream and downstream side from said metering valve, the location of the Coriolis meter corresponding to the side of said metering valve having a lesser relative variation in measured pressure per unit time.

4. The system for measuring and controlling a mass flow rate according to claim 1, wherein the correction factor is updated when the operating conditions are substantially static.

* * * * *